United States Patent [19]

Chino et al.

[11] Patent Number: 5,027,000
[45] Date of Patent: Jun. 25, 1991

[54] METHOD AND APPARATUS FOR GENERATING ELECTRICITY USING WAVE ENERGY

[75] Inventors: Hidenori Chino, Tokyo; Takashi Hara, Osaka; Kenji Tamura, Tokyo; Yasuhide Nakakuki, Tokyo; Yasuyuki Nii, Tokyo; Zenya Soma, Tokyo; Kiyoshi Nishihara, Tokyo, all of Japan

[73] Assignee: Takenaka Corporation, Osaka, Japan

[21] Appl. No.: 403,933

[22] Filed: Sep. 7, 1989

[30] Foreign Application Priority Data

Oct. 21, 1988 [JP] Japan ................... 63-265819

[51] Int. Cl.⁵ .............................. F03B 13/24
[52] U.S. Cl. ........................ 290/53; 60/398; 60/413; 60/418; 290/42; 417/330; 417/333; 417/334
[58] Field of Search ............... 60/398, 413, 418; 290/42, 53; 417/330, 333, 334

[56] References Cited

U.S. PATENT DOCUMENTS

| | | | |
|---|---|---|---|
| 416,972 | 12/1889 | Thomas | 417/333 |
| 875,042 | 12/1907 | Bissell | 60/398 |
| 3,996,741 | 12/1976 | Herberg | 60/413 |
| 4,274,010 | 6/1981 | Lawson-Tancred | 60/413 |

FOREIGN PATENT DOCUMENTS

| | | | |
|---|---|---|---|
| 95635 | 7/1975 | Japan. | |
| 113142 | 6/1977 | Japan. | |
| 434193 | 11/1974 | U.S.S.R. | 60/413 |

Primary Examiner—A. D. Pellinen
Assistant Examiner—Robert L. Hoover
Attorney, Agent, or Firm—Ronald P. Kanenen

[57] ABSTRACT

A wave power generating system for generating electricity using natural wave power, includes wave energy converters for converting wave energy into air pressure, a constant air pressure tank for storing the air pressure from the wave energy converters to equalize the fluctuation of the air pressure, an air turbine stationarily driven by the equalized air pressure, and an electric generator for generating stable electricity using the rotating power of the air turbine. The wave energy converters are settled to the bottom of the sea and are sufficiently tall to function as wave dissipation facilities. The air pressure in the constant air pressure tank is automatically controlled toward a target value by a controller and the target value is calculated by the controller in accordance with measured values of wave amplitude and period and the current air pressure of the constant air pressure tank. The wave power generating system can operate at the most efficiency when the air pressure in the constant air pressure tank is set to the target value.

12 Claims, 11 Drawing Sheets

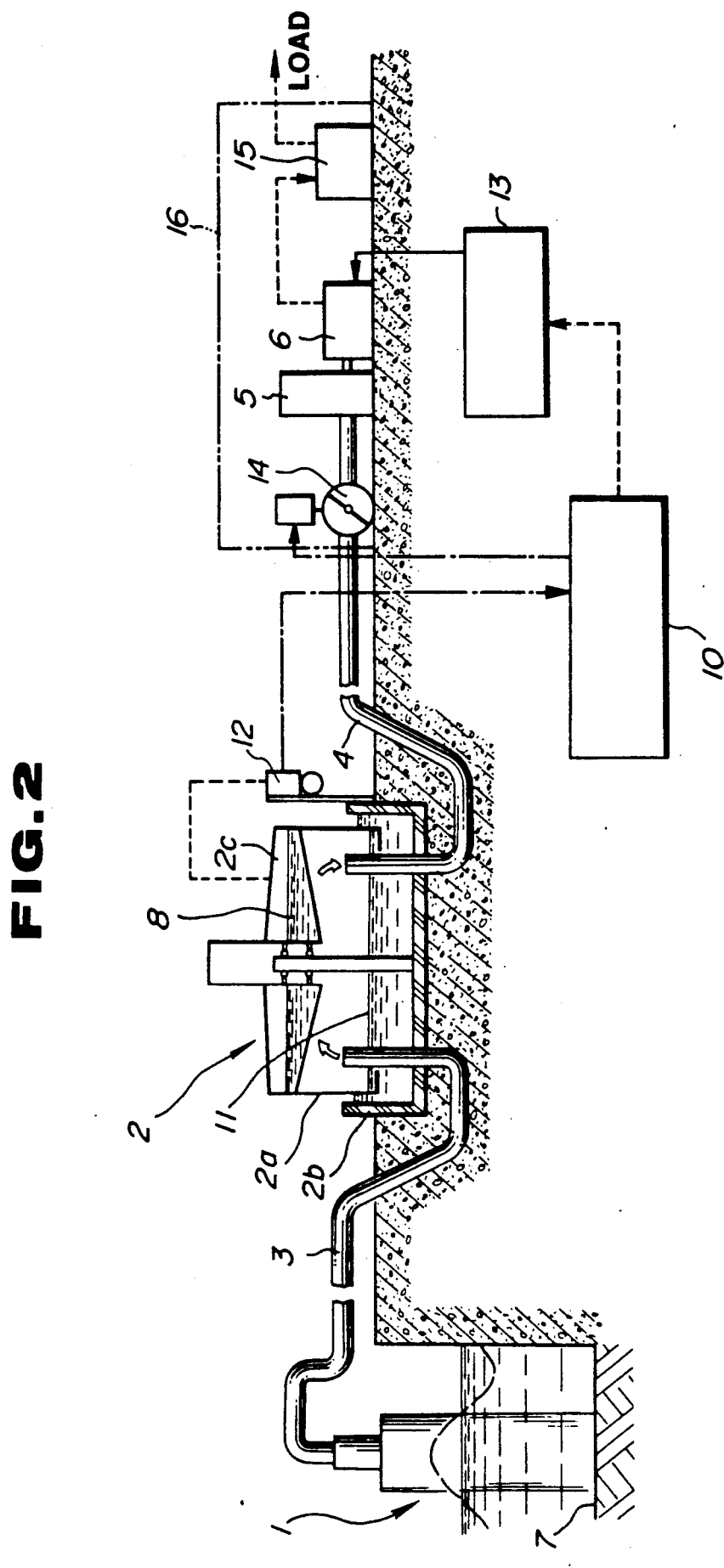

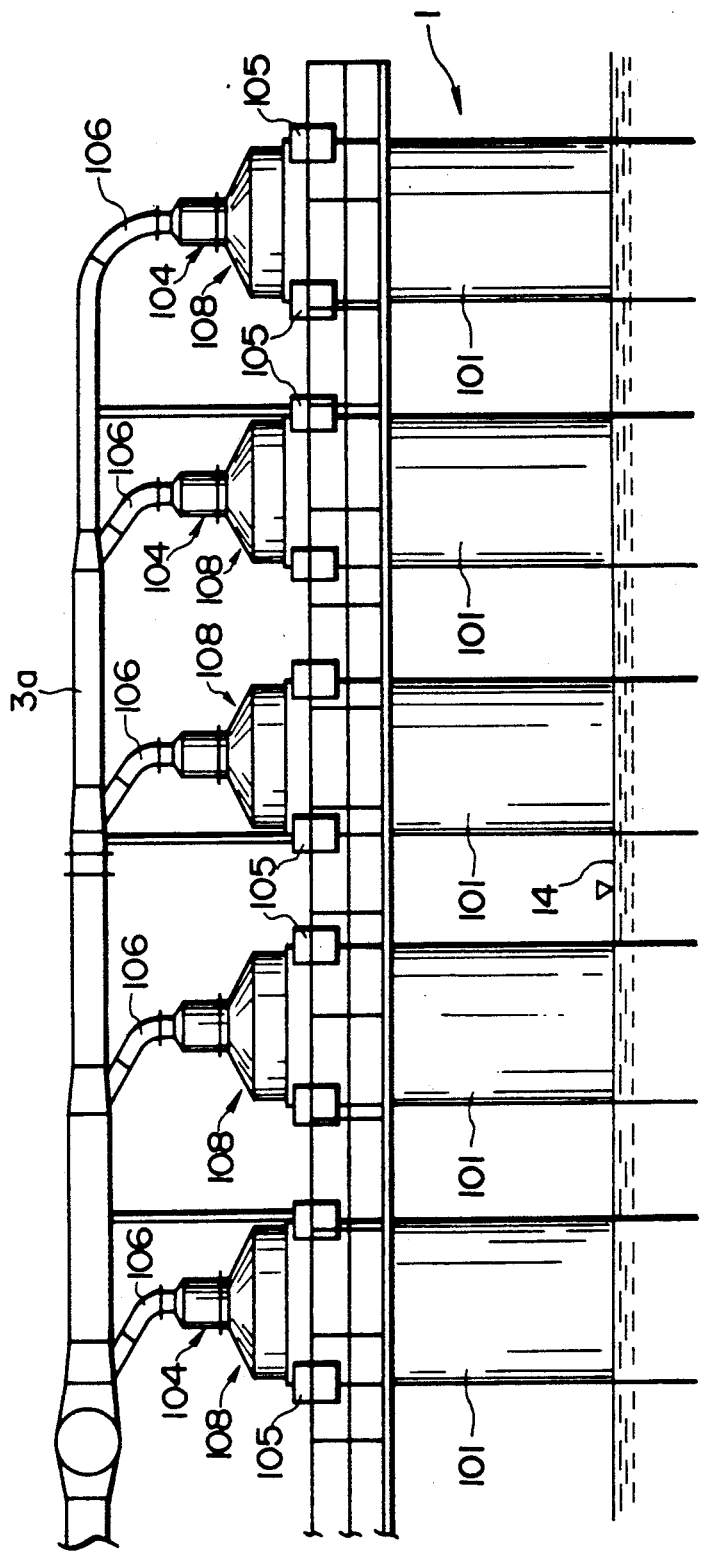

METHOD AND APPARATUS FOR GENERATING ELECTRICITY USING WAVE ENERGY

TECHNICAL FIELD

The present invention relates to a method and an apparatus for converting natural marine wave energy into air pressure and for driving an air turbine of an electric generator using the air pressure to produce useful and stable electric power suitable for commercial use. This invention is particularly beneficial for solitary islands or outlying regions which are far away from an ordinary power supply network.

BACKGROUND OF THE INVENTION

There has been much research to exploit unlimited marine wave energy to generate electricity efficiently. For example, the Japanese utility model application laid open No. 113142/77 discloses a wave power generating system including buoy type equipments moored on the sea. This system however can only generate small scale electric power to turn on at most only one buoy light. The Japanese patent application laid open No. 95635/75 describes another type of wave power generating system which is settled to the bottom of the sea as a wave dissipation facility. This system is not so useful either because of low efficiency of electric power generation.

An object of the present invention is therefore to provide a wave power generating system including a plurality of wave energy converters connected by way of a common air duct in parallel with one another and settled to the sea bottom or seaside, each of the wave energy converters having a cylindrical air chamber in which the water level rises and falls functioning as a piston for converting the wave power into air pressure, wherein the total air pressure energy produced by all the converters may become necessary and sufficient by increasing the number of the converters included in the system.

Another object of the present invention is to provide a wave power generating system capable of producing long-term stable electric power, including a constant air pressure tank of a variable capacity type receiving the air pressure energy transmitted from the wave energy converters for storing and equalizing the fluctuating air pressure by storing excessive air pressure when the amount of the air pressure energy is greater than the expense of an air turbine and by releasing the stored air pressure when otherwise to supply stable air pressure capable of operating the air turbine properly.

Yet another object of the present invention is to provide a method and an apparatus for wave power generation for adjusting the air pressure in the air chamber of the constant air pressure tank by varying the load of the air pressure tank, for improving the efficiency of the energy conversion in response to the effective wave amplitude fluctuation, and for automatically controlling the air pressure in the air chamber to prevent the air pressure from excursion from the upper and lower tolerance limits wherein the automatic control is, for example, performed by increasing or decreasing the magnetization voltage of a generator according to whether the air pressure in the chamber is rising or falling.

Still another object of the present invention is to provide a method and an apparatus for functioning as a wave dissipation facility including a plurality of wave energy converters settled in a line within a coastal area for being capable of forming a smooth water area therein suitable for exploiting as a marine farm or as a marine leisure facility.

Still another object of the present invention is to provide a method and an apparatus for wave power generation capable of being utilized alone or together with a conventional commerical power supply as an independent or auxiliary power supply for a solitary island or an outlying area being far away from a conventional power supply network, for refrigeration of processed marine products, or for coastal facilities such as a lighthouse and a light beacon.

SUMMARY OF THE INVENTION

In accordance with one aspect of the present invention, a method for generating electricity using marine wave power is disclosed and characterized in the steps of providing a plurality of wave energy converters settled to the sea bottom, the converter equipments being sufficiently tall above the sea level for functioning as wave dissipation facilities and each having an air chamber to convert wave energy into air pressure by means of varying water level for operating as an air piston in the air chamber, supplying the air pressure collected from the plurality of wave energy converters connected in parallel with one another to a constant air pressure tank having a variable sufficient capacity for temporarily storing the air pressure to equalize and stabilize the fluctuation of the air pressure, and supplying the stable air pressure to an air turbine for driving an electric generator.

Another aspect of the present invention is a method for generating electricity using wave power basically including the steps of converting wave power into air pressure, supplying the air pressure to a constant air pressure tank to temporarily store and equalize the air pressure, and applying the equalized air pressure to an air turbine of a generator stationarily. The wave power generating method is further characterized in the steps of providing a wave amplitude meter within the area where the wave energy converters are settled, providing an air pressure meter in the air chamber of each wave energy converter, providing a vertically moving air tank as the constant air pressure tank, the top portion thereof having a load container storing a load, providing a pressure control apparatus for controlling the pressure in the tank by adjusting the load applied to the load container, using a variable turbine as the air turbine, inputting to the controller the signals representing the amplitude and period of the wave measured by the amplitude meter and the air pressure in the chamber measured by the pressure meter to cause the controller to calculate an effective wave amplitude and a target air pressure for properly stabilizing the air pressure in response to the effective wave amplitude, controlling the pressure controller in accordance with the calculated results to adjust the load applied to the load container whereby the total weight of the load and the air tank is applied to the air in the chamber for setting the pressure to the target value, and controlling the variable turbine to generate electricity. This wave power generating method is further characterized in controlling the wave amplitude and air pressure meters to continue to measure for a constant period at a constant interval and inputting the measured results to the controller as the basic data for calculation of the effective wave amplitude during the measurement.

Still another aspect of the present invention is also a wave power generating method basically including the steps of converting wave power into air pressure, supplying the air pressure to a constant air pressure tank to temporarily store and equalize the air pressure, and applying the equalized air pressure to an air turbine of a generator stationarily. The wave power generating method is further characterized in the steps of measuring the vertical movement of the constant pressure tank with a level meter, inputting the measured value to the controller to increase or decrease magnetization voltage of the generator when the constant pressure tank is moving upward or when moving downward.

In accordance with another aspect of the present invention, a wave power generating system comprises a plurality of wave energy converters settled to the sea bottom, the converter equipments being sufficiently tall above the sea level for functioning as wave dissipation facilities and each having an air chamber to convert wave energy into air pressure by means of a varying water level for operating as an air piston in the air chamber, a head air duct connecting the plurality of wave energy converters in parallel with one another, a constant air pressure tank having a variable sufficient capacity, having an inlet air duct connected to the head air duct, and having an outlet air duct to transmit the air pressure equalized by the constant air pressure tank, an air turbine connected to the air outlet duct, an electric generator connected to the revolving shaft of the air turbine, and a controller.

The constant pressure tank used for the foregoing wave power generating system comprises a water tank having an upper opening for storing water up to a predetermined level, a vertically movable air tank having a lower opening sunk under the water level in the water tank, a load container provided at the top portion of the air tank, and inlet and outlet air ducts communicating with the air chamber of the air tank. The water tank has a substantially perpendicular rigid strut and the air tank having a slide mechanism can slide up and down in the vertical direction along the rigid strut of the water tank. The load container of the air tank is formed of a container for storing a load such as water, oil, or sand which is controlled by the air pressure controller.

The wave power generating system of the present invention is further characterized in that the constant air pressure tank comprises a water tank having an upper opening for storing water up to a predetermined level, an air tank having a bottom opening sunk under the water level in the water tank and being capable of moving up and down in the vertical direction, a load container provided at the top portion of the air tank, and an inlet air duct and an outlet air duct of the air tank communicating with the air chamber in the air tank, wherein the water tank has a substantially perpendicular rigid strut and the air tank having a slide mechanism can slide up and down in the vertical direction along the rigid strut of the water tank. The air pressure controller comprises a pump for supplying water as a load from the water tank to the load container of the air tank, and a valve for feeding the water in the load container back to the water tank.

The wave power generating system of another aspect of the present invention having no water tank comprises an air tank having a bottom opening sunk under the water level of the sea and being capable of moving up and down in the vertical direction, a load container provided at the top portion of the air tank, and inlet and outlet air ducts of the air tank communicating with the air chamber in the air tank, wherein a substantially perpendicular rigid strut is settled to the sea bottom or other similar water bottom and the air tank have a slide mechanism can slide up and down in the vertical direction along the rigid strut. The air pressure controller comprises a pump for supplying water as a load from the sea to the load container of the air tank, and a valve for feeding the water in the load container back to the sea.

The wave power generating system is further characterized in that a pump for supplying water as a load to the load container and an outlet valve for releasing water in the load container outside are automatically controlled in accordance with the value measured by the wave amplitude meter settled at the sea area of the wave energy converters.

The wave power generating system of still another aspect of this invention is characterized in the method for controlling the air pressure in the air chamber of the constant air pressure tank, including the steps of forming an air chamber of the space confined by a water tank having an upward opening for storing water up to a predetermined level and an air tank having a downward opening capable of moving up and down in the vertical direction, connecting an inlet air duct and an outlet air duct to the air tank, providing a load container at the top portion of the air tank, properly supplying to or removing from the load container a load such as fluid or corpuscular material to set the air pressure to a target value by applying to the air in the air chamber the total weight of the air tank and the load.

In accordance with another aspect of the present invention, the wave power generating system comprises a structure having the top portion thereof projecting up to a predetermined height above the sea level and having the bottom opening thereof sunk under the sea level wherein the sea level in the structure varies up and down functioning as a piston to form an air chamber in the structure, and a valve mechanism including inlet and outlet air valves provided at the top portion of a casing which forms a portion of the air chamber. The valve mechanism further comprises an air outlet tube provided at the central top portion of the casing and the air inlet tube provided at the peripheral top portion of the casing. The air inlet and outlet tubes have an inlet valve and an outlet valve respectively, each thereof including a valve seat provided at the opening to the air outside or inside and a ball to sit on or off the valve seat in response to the balance of inner and outer air pressures.

In accordance with still another aspect of the present invention, the wave energy converter of the power wave generating system comprises a structure of a steel tube settled by boring to the sea bottom, a water inlet formed on the steel tube, the upper rim thereof being at a position of about 10–20 centimeters below the sea level, a pressure receiving plate upwardly inclining toward the inner of the tube about 30–60 degrees, and a valve mechanism including air inlet and outlet valves provided at the top portion of the steel tube projecting above the sea level, wherein an air chamber is formed in the steel tube by the water flowing in through the water inlet.

The foregoing and other objects, features, and advantages of the present invention will become more apparent from the following detailed description of preferred embodiments which proceed with reference to the accompanying drawings.

BRIEF DESCRIPTION OF THE DRAWINGS

FIG. 2 is a conceptual diagram of a wave power generating system of the present invention.

FIGS. 4A and 4B are diagrams to show respective front and side views of a wave energy converter.

DETAILED DESCRIPTION OF EMBODIMENTS OF THE INVENTION

Figure 1:
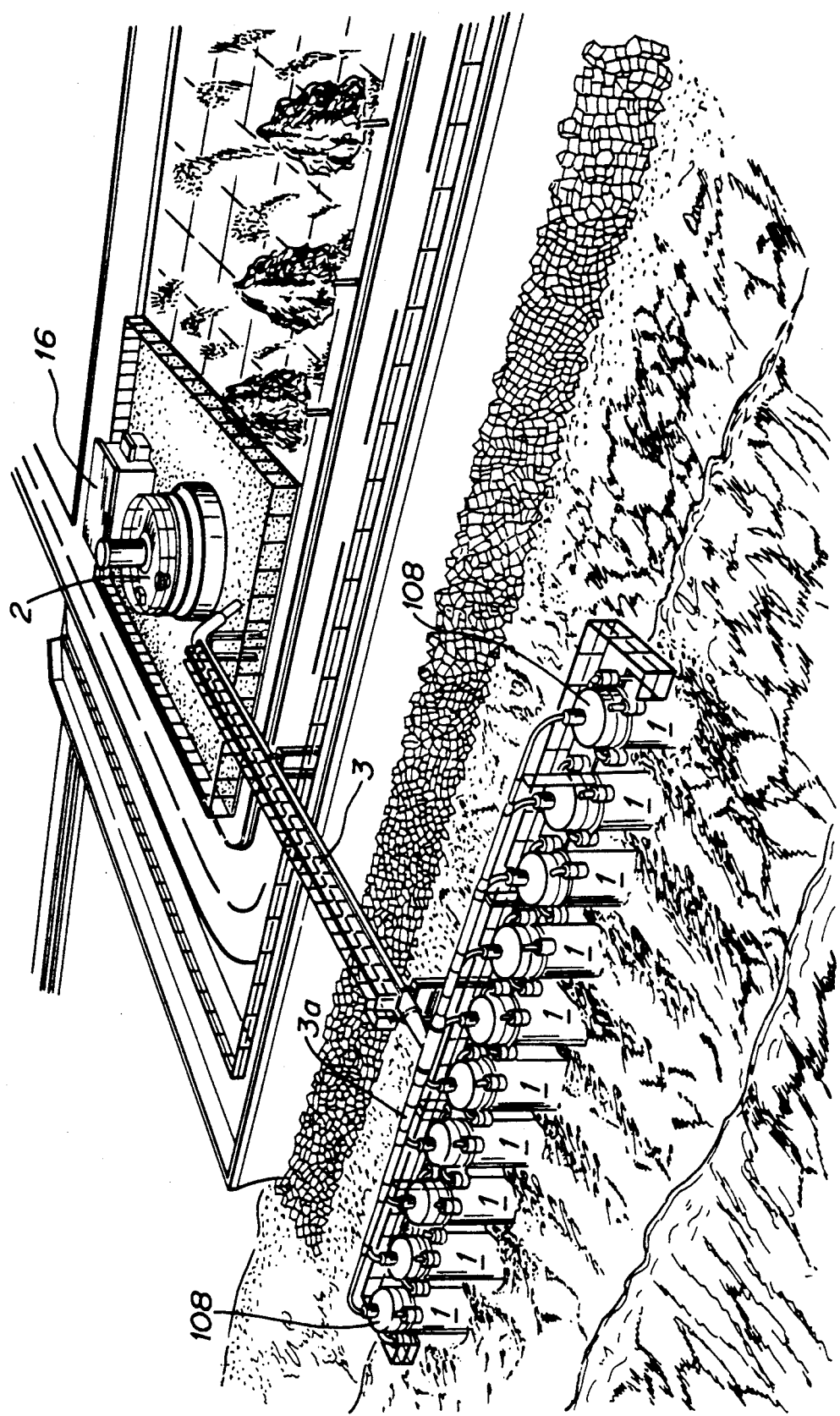
FIG. 1 is a perspective view of an embodying wave power generating system of the present invention.

As shown in FIGS. 1 and 2, the wave power generating system comprises multiple wave energy converters 1 for converting wave energy into air pressure. The wave energy converters are settled to the sea bottom 7 and arranged in a line so as to function as wave dissipation facilities. The air pressure energy from the wave energy converters 1 is transmitted by way of a head pipe 3a and an air duct 3 to an air chamber 2a of an constant air pressure tank 2 settled on the land for storing the energy temporarily to equalize and stabilize the fluctuating air pressure energy. The constant air pressure tank 2 includes an air tank 2a and a water tank 2b storing water 11. The air tank 2a has a bottom opening sunk below the water level and is floating in the water tank 2b so that the air chamber 2a comes to be airtight and capable of moving up and down in the vertical direction. Therefore, when air pressure energy is supplied by way of an air duct 3 to the tank 2a, the air tank 2a will rise up to increase the capacity of the air chamber by temporarily storing additional air, so that the air pressure in the air tank 2a tends to remain constant because of the weight of the air tank 2a and load material 8 in the load container 2c. The equalized air pressure energy is stationarily transmitted from the constant air pressure tank 2 by way of an outlet air duct 4 to an air turbine 5 in the same building, so that the air pressure drives the air turbine 5, the revolving shaft thereof being coupled to electric generator 6 for generating electricity. The electric power from the generator 6 is temporarily stored in a capacitor 15 to supply stable electric power to load devices.

Figure 3A:
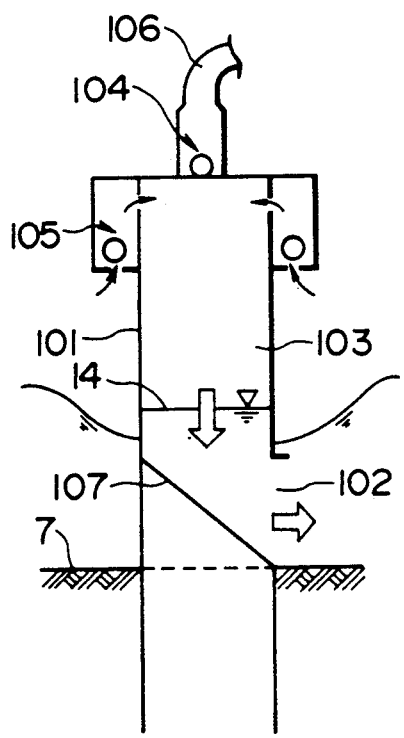
FIGS. 3A and 3B are diagrams to show the operating principle of a wave energy converter.
Figure 3B:
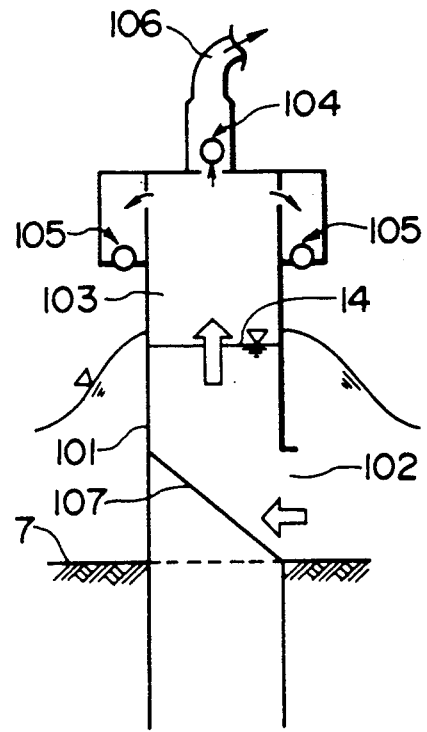

FIGS. 3A and 3B are diagrams of the operation principle of wave energy converter 1 for converting unlimited marine wave energy into air pressure energy. When the wave amplitude varies up and down, the water level in a hollow structure 101 moves up and down so as to function as a piston for compressing and drawing in the air in a chamber 103 because the water in the chamber 103 communicates through an inlet 102 with the sea water outside. As shown in FIG. 3A, when the wave amplitude becomes lower and the water level 14 in the air chamber 103 accordingly becomes lower, the wave energy converter works for an intake stroke to draw in air from the outside. During the intake stroke, the ball of an outlet valve 104 falls down to close the outlet because of an air pressure drop in the chamber 103. On the other hand, the balls of the inlet valve 105 rise up and open the valve due to the difference between inner and outer air pressures to draw in air from the outside. As shown in FIG. 3B, when the wave amplitude becomes higher and the water level in the chamber 103 also becomes higher, the converter works for a compression stroke to compress and output the air in the chamber from the outlet valve 104 to the air duct 106 by closing the valves 105 and opening the valve 104. The repetition of the intake and compression strokes permits the air energy converter 1 to continuously convert natural unlimited wave energy into air pressure energy which is transmitted by way of the air duct 3 to the constant air pressure tank 2. Furthermore, the head pipe 3a collects the air pressure energy from many wave energy converters 1 to produce necessary and sufficient air pressure energy coupled to the constant air pressure tank 2.

FIGS. 4–7 show the wave energy converter 1 more specifically. The wave energy converter 1 has a structure of a steel tube 101 of about 1.9 meters in diameter which is settled by a perpendicular boring to the sea bottom 7. The steel tube 101 has an opening 102 of which the upper rim is positioned about 10–20 centimeters below the sea level to acquire the wave energy at the most efficiency. Referring to FIGS. 3A and 3B, the steel tube includes a pressure receiving plate 107 inclined upwardly about 45 degrees from the lower rim of the opening 102. The inclined angle of the plate 107 may be within a range of 30–60 degrees to the horizontal according to peripheral conditions. Air chamber 103 is formed in the hollow steel tube portion above the pressure receiving plate 107. Wave motion through the inlet 102 is effectively converted into vertical motion in the steel tube 101 by the pressure receiving plate 107 and the vertical motion of the water level 14 in the tube 101 functions as a piston to draw in and compress air from outside. The steel tube 101 is firmly settled to the sea bottom by means of a concrete block 30 and hydraulic cement.

Figure 4B:
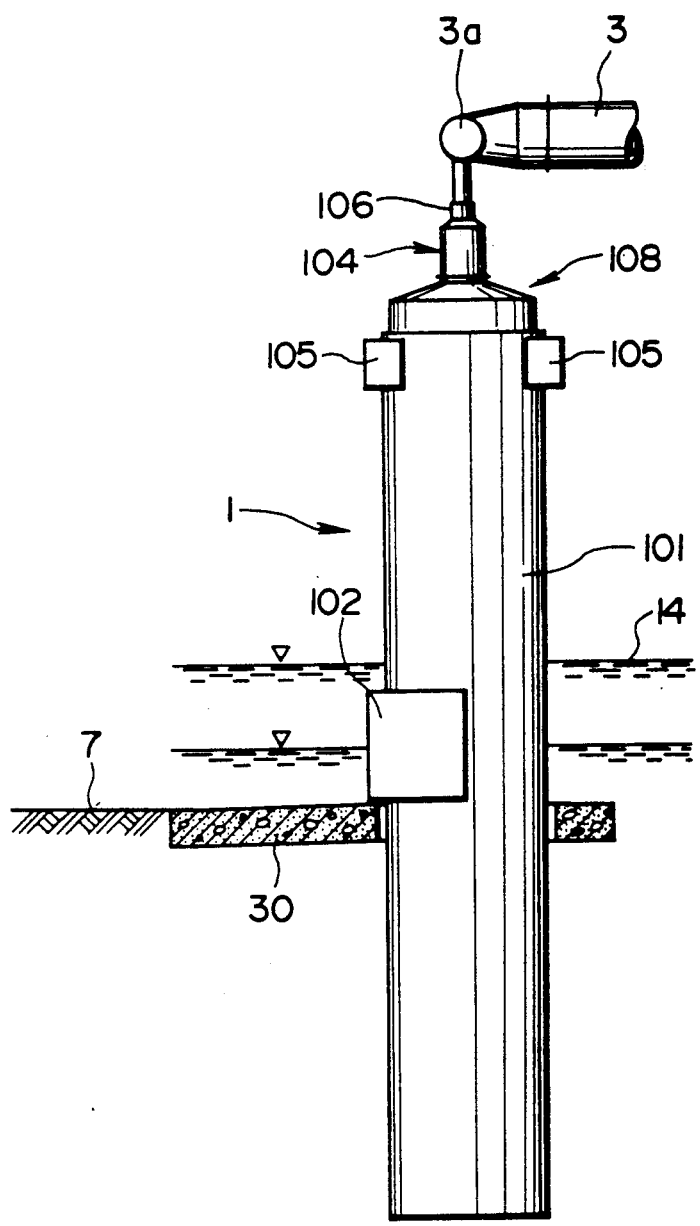
Figure 6:
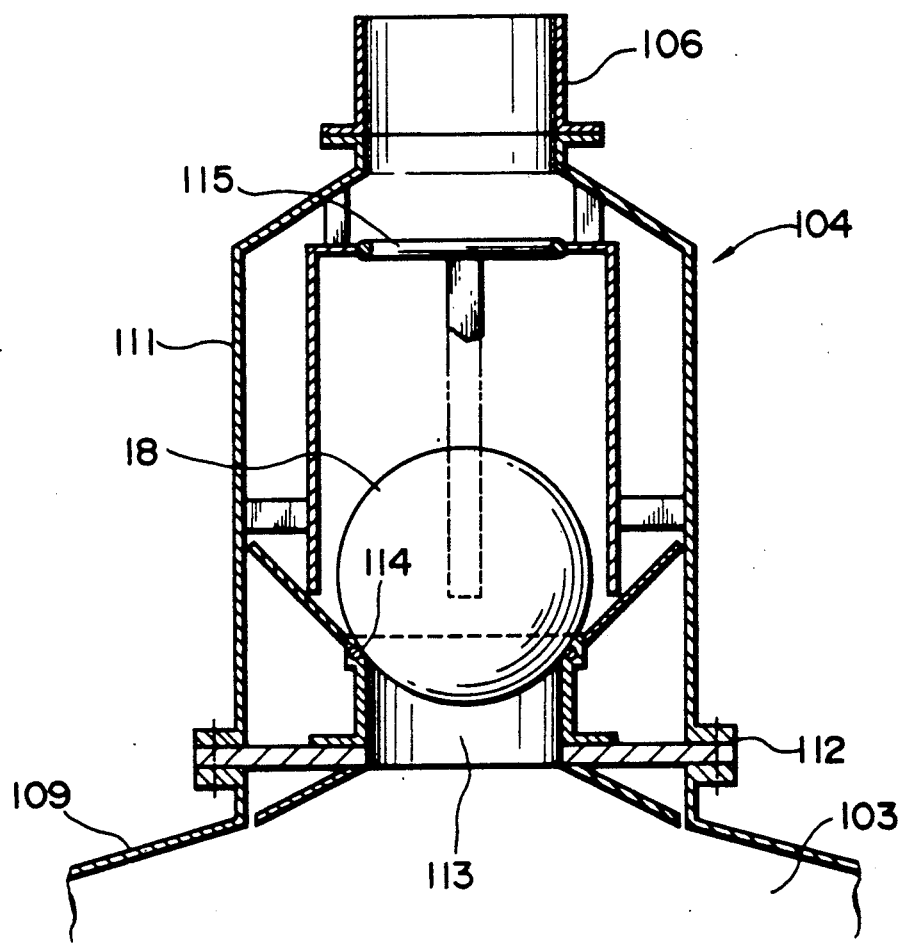
FIG. 6 is a sectional view of an air outlet valve.
Figure 7:
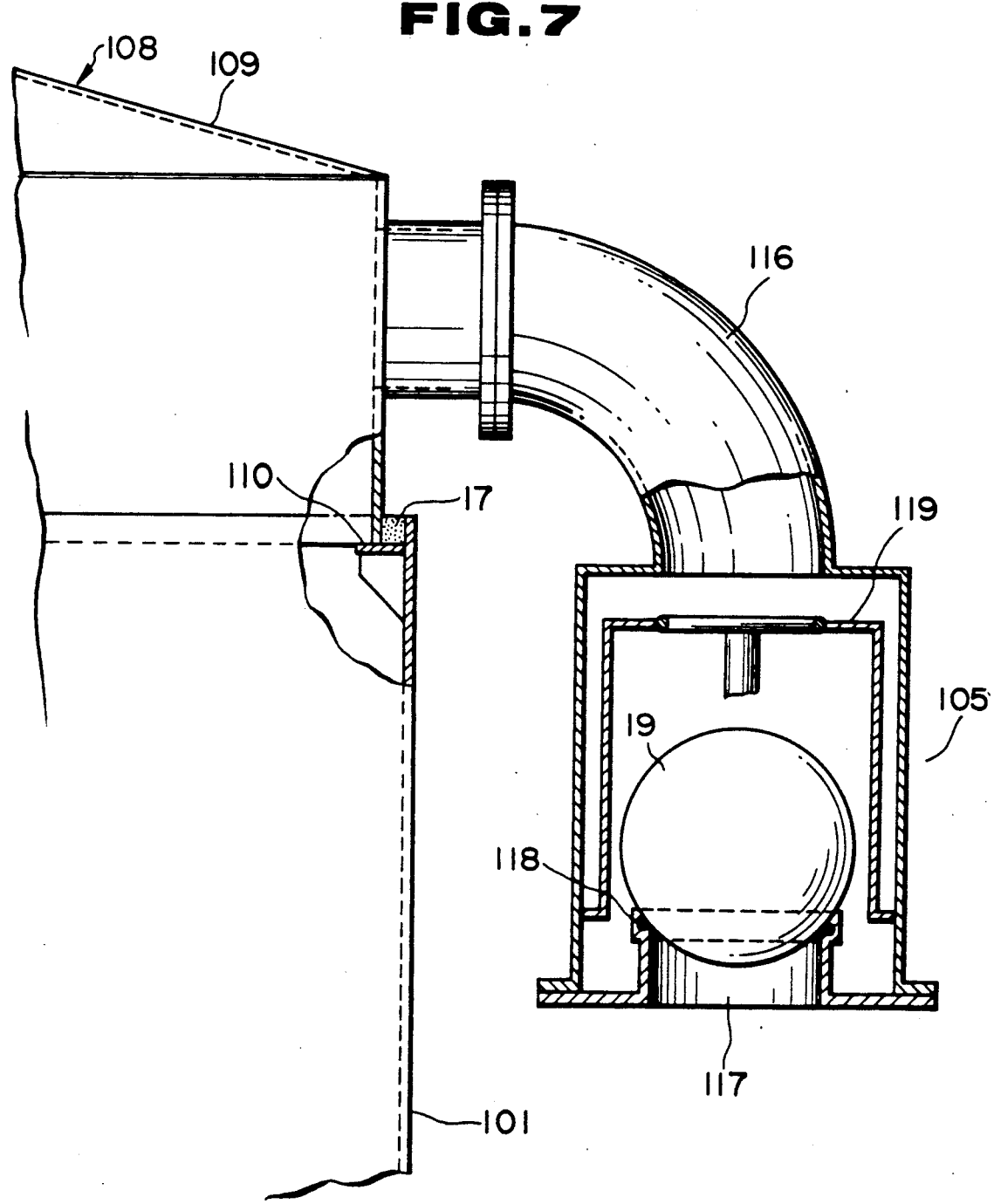
FIG. 7 is a sectional view of an air inlet valve.

A valve mechanism including air inlet valves 105 and air outlet valve 104 is provided at the top portion of the steel tube 101. As shown in detail in FIGS. 5A, 5B and an 7, the valve mechanism includes a casing 109 as a main portion forming an upper cover of the air chamber 103 in the steel tube 101. The casing 109 is of a bowl shape having a diameter of about 2 meters and a height of about 800 millimeters. As shown in FIG. 7, the casing 109 is welded to the flange 110 of the steel tube 101 and the slot around the welded portion is filled with caulking material 17 to prevent air leakage. As shown in FIG. 6, a valve housing 111 for surrounding the outlet valve 6, has a flange connector welded to the top portion of the casing 109. The valve housing 111 is connected to the outlet air duct 106 which is further connected to the head air duct 3a as shown in FIGS. 4A and 4B. Referring to FIG. 6, a valve seat 114 is provided at the inlet opening 113 of the valve housing 111. A ball 18 made of plastic has light weight and proper rigidity so that the ball 18 can firmly close the inlet opening 113 normally and when the compressed air pressure in the air chamber 103 becomes more than a predetermined value, the ball 18 floats up from the valve seat 114. The ball 18 has diameter of about 350 millimeters. A stopper frame 115 is provided above the valve seat 114 to prevent the ball 18 from floating up more than about 300 millimeters from the valve seat 114. Therefore, when the air pressure applied to the inlet opening 113 becomes lower than a predetermined value, the ball 18 falls down to firmly shut the outlet valve 104. Sufficient rigidity is required for the ball 18 to resist against the air pressure during the intake stroke.

Figure 5A:
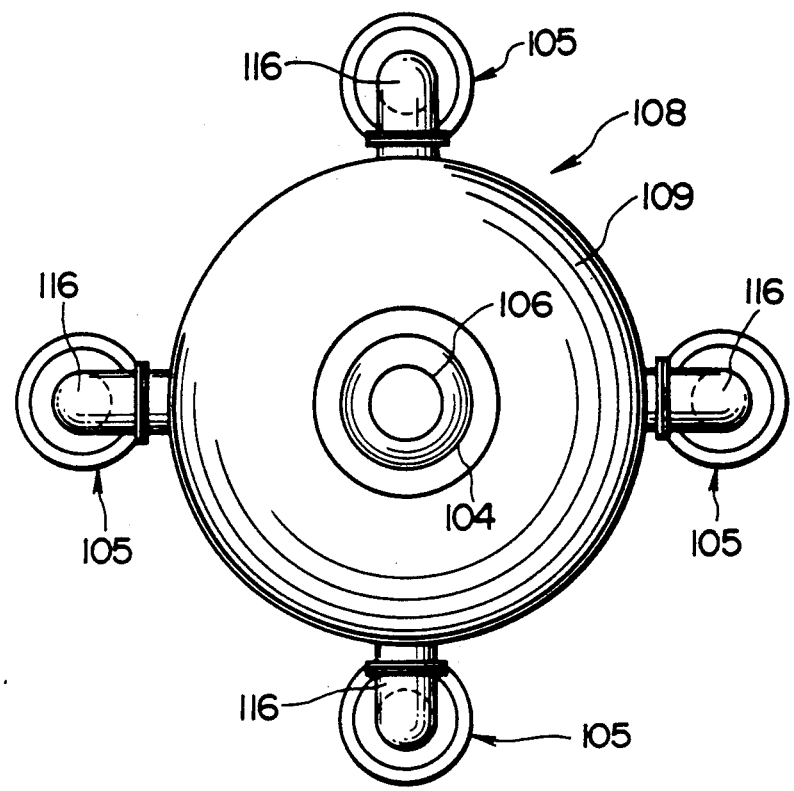
FIGS. 5A and 5B are diagrams to show plan and front views of a valve mechanism positioned at the top portion of a wave energy converter.
Figure 5B:
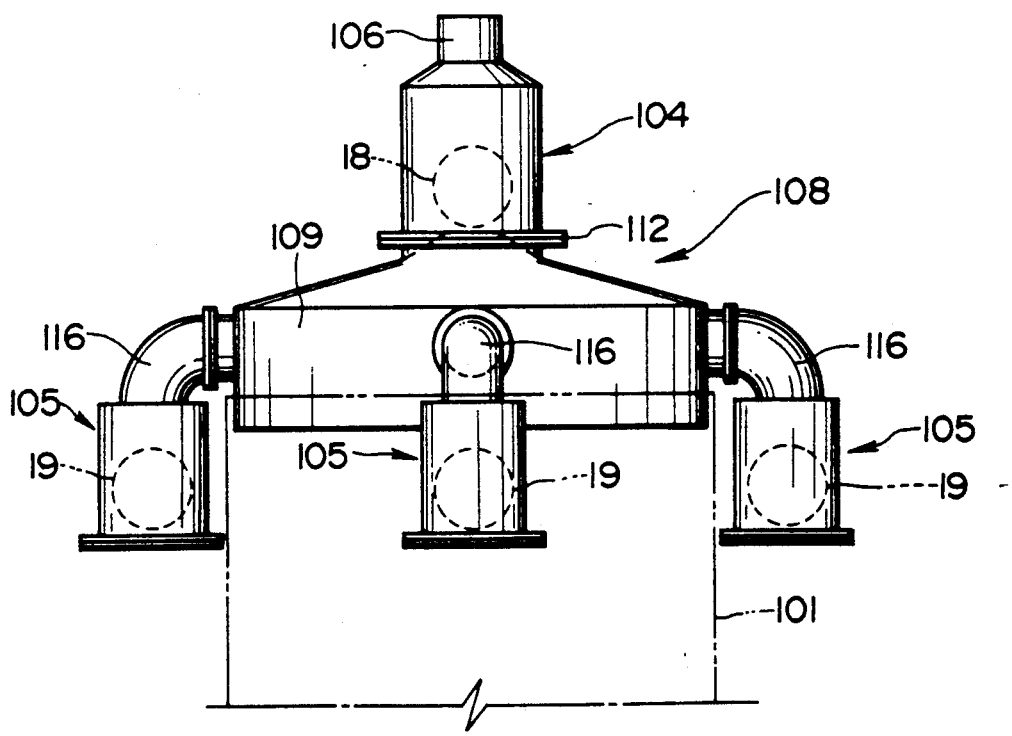

As shown in FIGS. 5A and 5B, four air inlet tubes 116 formed of 90 degree-bent tubes are respectively connected to quadrant positions on the side wall of the casing 109. The openings of the bent tubes 116 are settled to face downward. As shown in FIG. 7 in detail, a valve seat 118 is provided at the opening portion 117 of each of the inlet tubes 116 and each inlet valve 105 is formed of the valve seat 118 and ball 19 to seat on the valve seat 118. During the intake stroke of the wave energy converter 1, the ball 19 is raised up from the valve seat 118 by the intake air pressure and the inlet valve 105 is opened. When the inlet air pressure becomes less than a predetermined value, the ball falls down on the valve seat 118 to close the inlet valve 105. Similarly the ball 19 has light weight and proper rigidity and the diameter of the ball 19 is about 350 millimeters. Stop frame 119 is provided above the valve seat 118 to prevent the ball 19 from rising up more than a predetermined limit height and ensure that the ball 19 certainly sits back on the valve seat 118 in response to reduction of the inlet air pressure.

Thus, as described hereinabove in connection with FIGS. 3A and 3B, during the compression stroke when the wave amplitude in the sea and the water level 14 in the air chamber 103 together become higher, the compressed air pressure causes the balls 18 and 19 of the outlet and inlet valves 104 and 105 to rise up and fall down respectively and thereby the outlet and inlet valves 104 and 105 are opened and closed respectively. Accordingly, the compressed air flows from the air chamber 103 by way of the outlet tube 106 to the head air duct 3a. For this period the ball 19 of the inlet valve 105 is pressed to the valve seat 118 by the compressed air and the inlet valve 105 remains closed. On the contrary, when the wave amplitude of the sea and the water level 14 of the air chamber 103 become lower to enter the intake stroke, the ball 18 of the outlet valve 104 quickly falls down due to the self weight of the ball and intake pressure around the inlet 113 to shut up the outlet valve 104. On the other hand, since the ball 19 is raised up from the valve seat 118, the inlet valve 105 opens and air flows into the air chamber 103. Such repetition of the intake and compression strokes causes the wave energy converter 1 to continuously convert wave energy into air pressure energy to transmit to the constant air pressure tank.

When the inlet and outlet valves 105 and 104 operate, only the balls 19 and 18 rise up or fall down so that there are no other parts moving mechanically and accordingly the wave energy converter is expected to be very durable and no trouble. Furthermore, it produces little noise caused by any mechanical operations and operates very quiet.

Since the number of the wave energy converters 1 used for the wave power generating system is easily selectable by determining whether each outlet tube of the wave energy converters is connected to the head air duct 3a, design and implementation of the system can be performed freely. Even though the wave power generating system once starts to operate, it would be very easy to increase or decrease the generation power thereof. When any inspection or repair is required, only the required converter may be removed from the head air duct 3a without interrupting the operations of any other converters. As to inspection or repair of the valve mechanism 108, only the required outlet or inlet valve 104 or 105 can easily be removed or the valve mechanism 108 can entirely be removed and exchanged by a new one if necessary.

Since the steel tube 101 settled to the bottom of the sea sufficiently projects upward above the sea level, it can function as a wave dissipation or breakwater facility for intercepting or breaking incoming sea waves. The wave power generating system is formed of a plurality of wave energy converters arranged in a line and settled to the sea bottom. Therefore, it is possible to change a rough coastal area into a highly useful area of smooth water which can be exploited for a marine farm, a marine resort area and so forth.

Figure 8:
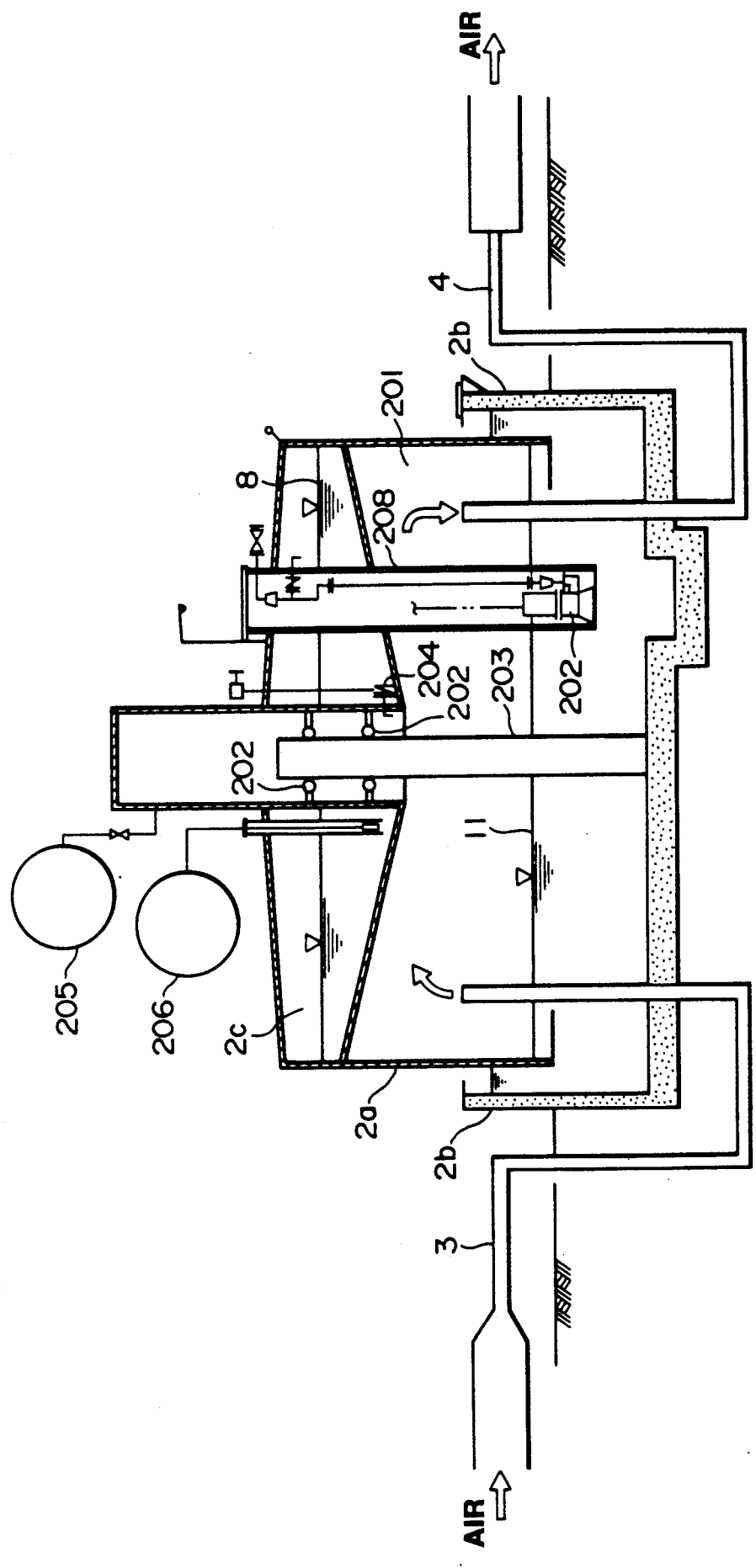
FIG. 8 is a sectional view of a constant air pressure tank.

The head air duct 3a connected to multiple wave energy converters collects air pressure received therefrom to transmit the collected air pressure by way of the air duct 3 to the constant air pressure tank 2 settled on land. As shown in FIG. 8 in detail, the constant air pressure tank 2 comprises a water tank 2b for storing water 11 up to a predetermined level and an air tank 2a of a bowl shape having a bottom opening sunk up to a predetermined depth below the water level in the water tank 2b to form a tightly closed air chamber 201 therein. The air tank 2a is floating in the water 11 in the water tank 2b and capable of sliding up and down by means of a sliding mechanism 202 along a rigid strut 203 perpendicularly standing on the bottom of the water tank 2b. The air tank 2a is formed of anticorrosive steel. The water tank 2b horizontally positioned on land is a cylindrical container having an upper opening which is made up of reinforced concrete. Even if the air tank 2a receives a horizontal external force because of an earthquake and so forth, it is safely supported by the rigid strut 203.

The air chamber 201 has an inlet air duct 3 and an outlet air duct 4, both thereof positioned sufficiently above the water level of the water tank 2b, wherein the inlet air duct 3 leads the air pressure from the wave energy converters 1 to the air chamber 201 and the outlet air duct 4 continuously transmits the equalized air pressure energy to the air turbine 5.

A load container 2c is provided at the top portion of the air tank 2a and contains water 8 as a load to set the air pressure in the air chamber 201 to a predetermined target value. The water 8 in the load container 2c is brought by a hydraulic pump 202 from the water 11 in the water tank 2b. The pump 202 is positioned in the water 11 by a cylindrical casing 208 suspended from the ceiling of the air tank 2a. Or, the pump 202 may be provided in the load container 2c. The water 8 in the load container 2c may be returned into the water tank 2b by opening outlet valve 204. Although the hydraulic pump 202 and the outlet valve 204 may be operated manually, as shown in FIG. 8, it may be ordinary to automatically control them in accordance with the measured air pressure in the air chamber 201 and the measured amount of water 8 and the measured value of wave amplitude meter 21 in FIG. 9, so that the air pressure in the air chamber 201 is automatically set to a target value to acquire the air pressure energy from the inlet air duct 3 at the most efficiency. The air pressure in the air chamber 201 and the amount of water in the load container 2c are respectively measured by the air pressure meter 205 and the water level meter 206 and then the measured values are transmitted to the controller 10. When the target pressure value is updated, or in accordance with the difference between the air pressure energy from the inlet air duct 3 and the outputting air pressure energy through the outlet air duct 4, the air tank 2a vertically moves up or down to change the capacity of the air chamber 201 of the air tank 2a. The air tank 2a has a diameter of about 10 meters and a height of about 5 meters.

Although not shown in the drawings, the constant air pressure tank 2 can be made without using any artifical water tank such as the above water tank 2b. For example, instead of such a water tank, an air tank is provided at the sea area of 3-5 meters depth and a rigid strut is settled to the bottom of the sea. The air tank can move up and down by sliding along the rigid strut. The air tank has a bottom opening sunk below the sea level and accordingly a tightly closed air chamber is formed in the air tank. At the top portion of the air tank, a load container is formed to store water as load material transmitted from the sea by a pump. The water in the load container is supplied back to the sea by opening an outlet valve. Furthermore, inlet and outlet air ducts are provided to communicate with the air chamber in the air tank in the same manner as the above embodiment. In this case, the construction cost of the system is reduced since any artificial water tank is unnecessary. Fluid such as water or oil or corpuscular material such as sand may be used for the load material.

In FIG. 2 the wave power generating system has a controlling valve 14 provided at the outlet air duct 4 connected between the constant air pressure tank 2 and the air turbine 5 to adjust the amount of air pressure energy flowing through the outlet air duct 4. The controller 10 automatically controls the controlling valve 14 to close, open, or adjust the air pressure flow through the outlet air duct 4. The controller 10 receives data measured by a level meter 12 for the real time measurement of the position level and moving direction of the air tank 2a for moving between the upper and lower position limits. The controller 10 processes the data from the level meter 12 for determining whether the air tank 2a is moving up or down, for calculating an optimum magnetization voltage of the generator 6 in accordance with the moving state (or moving velocity) of the air tank 2a, and for supplying the result to the magnetizing controller 13 to control the magnetization voltage of the generator. When the air tank 2a tends to move up, the controller 10 controls the magnetizing controller to increase the magnetization voltage of the generator 6 so that the load torque of the generator increases and accordingly the amount of air energy consumed by the air turbine also increases. As the result, the air tank 2a stops rising up or starts falling down in accordance with the change of balance condition between the air pressure energy flowing into the constant air pressure tank 2 and the air pressure energy consumed by the air turbine 5. In this case, the electric power generated by the generator 6 is increased. On the contrary, when the air tank 2a tends to move down, the controller 10 controls the magnetizing controller to decrease the magnetization voltage of the generator 6 so that the load torque of the generator decreases and accordingly the amount of air energy consumed by the air turbine also decreases. Therefore, the air tank 2a stops falling down or starts rising up in accordance with the change of balance condition between the air pressure energy flowing into the constant air pressure tank 2 and the air pressure energy consumed by the air turbine 5. In this case, the output electric power from generator 6 is decreased. According to the constant air pressure tank 2, the vertical position of the air tank 2a is properly controlled in immediate response to the change of air pressure energy acquired by the wave energy converters or in immediate response to the change of waves in the sea. The controller surely controls the constant air pressure tank to position the air tank 2a floating in the water tank 2b within a predetermined range between upper and lower limits so that the constant air pressure tank 2 is optimized to accomplish very stable electric power generation. Additionally, the constant air pressure tank 2 may be controlled by combining the control of the controlling valve 14 for adjusting the amount of air pressure energy flowing through the outlet air duct 4 with the control of the load to be stored in the load container 2c of the constant air pressure tank 2.

Figure 9:
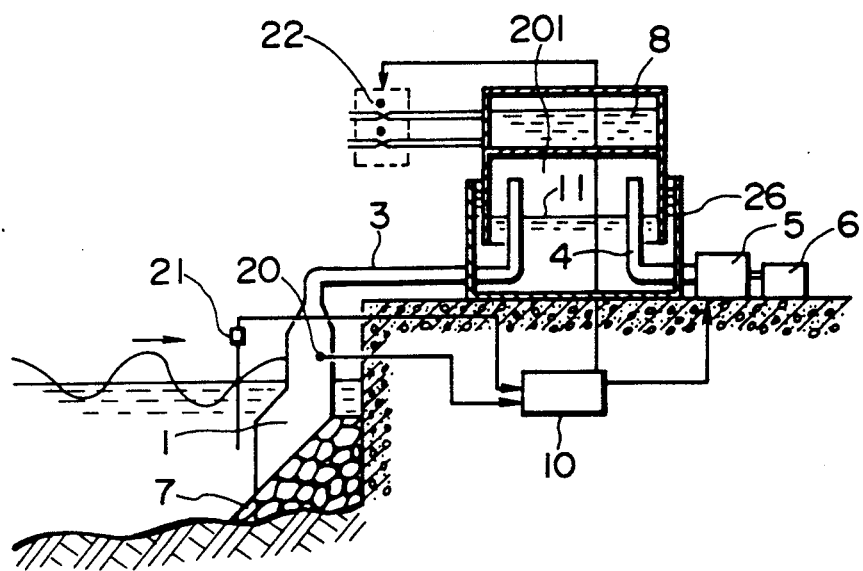
FIG. 9 is a diagram to explain another controlling method of a constant air pressure tank.

In accordance with another controlling method of the constant air pressure tank 2, as shown in FIG. 9, an air pressure meter 20 may be provided in the air chamber of the wave energy converter 1 to measure air pressure therein. A wave amplitude meter 21 for measuring the amplitude and period of waves may be provided at the area adjacent to the wave energy converter 1. The data measured by the both meters 20 and 21 are supplied to the controller 10. The controller 10 controls a pressure controller 22 for controlling the load supplied to the load container 2c of the constant air pressure tank 2. As to the wave behavior at the area of the wave energy converter, the wave amplitude meter 21 measures the amplitude and period of waves for each predetermined period of time at predetermined intervals, for example, for twenty minutes at intervals of two hours. Then, the measured values are applied to the controller 10 including a microcomputer. Simultaneously, the air pressure meter 20 measures the air pressure in the air chamber of the wave energy converter 1 and then the measured value is transmitted to the controller 10. The controller 10 determines not only the effective wave amplitude from the measured values but also the target value of the air pressure for optimizing the constant air pressure tank 2. The target value of the air pressure is determined as $(W+W')/S$, where W is the known constant weight of the air tank 2a and W' is a variable weight of a load in the load container 2c and S is the known laterally sectional area of the load container 2c. Thus, the target value of the air pressure is determined by the weight W' of the load in the load container 2c. For example, when the effective wave amplitude is determined as a comparatively small value such as one meter, the air pressure of the air tank is set to a lower value such as 0.5 meters of water (500 kilograms/cubic meter) by reducing the weight of the load applied to the load container 2c, so that such a small energy from the low effective amplitude is effectively introduced into the air tank 2. When the effective wave amplitude is determined as two meters, the load weight is increased to set the air pressure of the tank 2 to one meter of water (1000 kilograms/cubic meter). Furthermore, when the effective wave amplitude is determined as three meters, the air pressure is similarly set to 1.5 meters of water (1500 kilograms/cubic meter) to store the air from the wave energy converter 1. The controller 10 supplies the determined values to the pressure controller 22 to adjust the air pressure of the constant air pressure tank 2 to the target value. The pressure controller 22 adjusts the load material (water 8) of the load container 2c in response to the data from the controller 10 to set the air pressure to the target value.

As described hereinbefore, when the air pressure is equalized in the air chamber 201, being set to the target value, the equalized air is stationarily applied to the air turbine 5 for converting the air pressure energy into rotating energy. If the air turbine is a variable air turbine, the controller 10 controls the variable air turbine to properly operate in accordance with the set target value of the air pressure in the constant air pressure tank 2. Specifically, when the set value of the constant air pressure tank 2 is low such as 0.5 meters of water, the nozzle-contraction-area ratio of the variable air turbine is decreased up to a small value such as 1/1000 by reducing the sectional area of the air flowing path in the nozzle. As the result, the variable turbine is capable of producing constant rotating energy for driving the generator 6 regardless of changes of the air pressure of the constant air pressure tank 2. The generator 6 is therefore capable of generating electricity having stable voltage and frequency.

Figure 10:
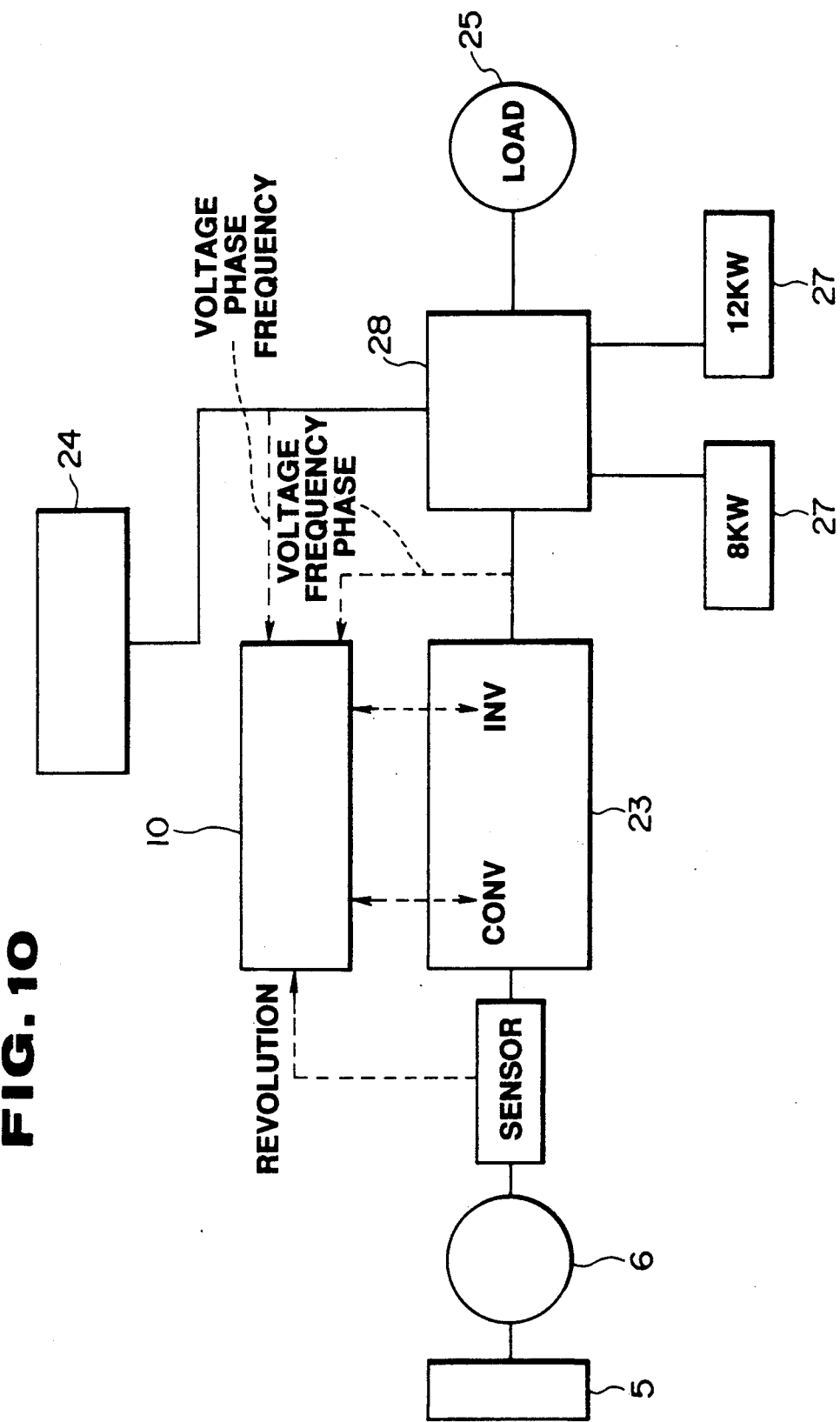
FIG. 10 is a conceptual diagram of a power supply network.

The air turbine 5 is a radial type capable of efficiently operating under low pressure levels such as 20-30 centimeters of water. The generator 6 is an alternating-current (or inverter type) generator. As shown in FIG. 10, the converter/inverter 23 electrically controls the output from the generator 6 to produce electricity of stable voltage and frequency without the influence of the revolution number of the air turbine 5.

In order to supply appropriate electric power to the load instrument 25, both the generator 6 and the commercial power supply source 24 are operated in parallel. Although the output frequency and voltage of the generator 6 are constant, the output power thereof depends on the amount of the current wave energy. When the output power of the generator 6 is less than the consumption power of the load instrument 25, the shortage of power is compensated by the additional operation of the commercial power supply source 24. When the output power of the generator 6 is greater than the consumption power of the load instrument 25, the excessive power is consumed by the power consuming resistors 27. The switchboard 28 receives both the outputs from the generator 6 and the commercial power supply source 24 to supply electric power to the load instrument 25 and/or the power consuming resistors 27.

An embodied wave power generating system comprises ten wave energy converters 1 connected in parallel with one another, each having a diameter of 2 meters for converting wave energy into air pressure energy, a constant air pressure tank 2 of diameter of 9.6 meters for equalizing the air pressure from the converters to stationarily supply the equalized air pressure to an air turbine 5, and a synchronized generator 6 of 30 kilowatts for generating electricity. In this experimental case, the maximum output power of the system reaches 30 kilowatts at 200 volts and 50 Hertz.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. In a method for generating electricity using wave power including the steps of converting wave energy into air pressure energy, supplying the air pressure energy to a constant air pressure tank to temporarily store and equalize the air pressure energy, and applying the equalized air pressure to an air turbine of a generator stationarily, the wave power generating method further comprising the steps of:
    providing a wave amplitude meter within the sea area where wave energy converters are settled;
    providing an air pressure meter in the air chamber of the each wave energy converter;
    providing a vertically moving air tank as the constant air pressure tank, the top portion thereof having a load container storing a load;
    providing an air pressure control apparatus for controlling the air pressure in the tank by adjusting the load supplied to the load container, using a variable turbine as the air turbine;
    inputting to a controller the signals representing the amplitude and period of the wave measured by the amplitude meter and the air pressure in the chamber measured by the air pressure meter to cause the controller to calculate an effective wave amplitude and a target air pressure for properly stabilizing the air pressure in response to the effective wave amplitude;
    controlling the air pressure controller in accordance with the calculated results to adjust the load applied to the load container whereby the total weight of the load and the air tank is applied to the air in the chamber for setting the pressure to the target value; and
    controlling the variable turbine for driving the generator to generate electricity.

2. A wave power generating method of claim 1 further comprising the steps of:
    controlling the wave amplitude and air pressure meters to continue to measure for each constant period at constant intervals; and
    inputting the measured results to the controller as the basic data for calculation of the effective wave amplitude during the measurement.

3. In a wave power generating method including the steps of converting wave energy into air pressure energy, supplying the air pressure to a constant air pressure tank to temporarily store and equalize the air pressure, and supplying the equalized air pressure to an air turbine of a generator stationarily, the wave power generating method further comprising the steps of:
    measuring the vertical movement of the constant pressure tank with a level meter,
    inputting the measured value to a controller to increase or decrease magnetization voltage of the generator when the constant pressure tank is moving upward or downward.

4. A wave power generating system comprising:
    a plurality of wave energy converters settled to the sea bottom, the converter equipments being sufficiently tall above the sea level for functioning as wave dissipation facilities and each having an air chamber to convert wave energy into air pressure by means of varying water level for operating as an air piston in the air chamber;
    a head air duct connecting the plurality of wave energy converters in parallel with one another;

a constant air pressure tank having a variable sufficient capacity, having an air inlet duct connected to the head air duct, and having an air outlet duct to transmit the air pressure equalized by the constant air pressure tank;

an air turbine connected to the air outlet duct;

an electric generator connected to the revolving shaft of the air turbine;

a controller means for controlling air pressure in said tank in response to a detected load parameter;

a water tank having an upper opening for storing water up to a predetermined level;

a vertically movable air tank having a lower opening sunk under the water level in the water tank;

a load container provided at the top portion of the air tank; and air inlet and outlet ducts communicating with the air chamber of the air tank;

wherein the water tank has a substantially perpendicular rigid strut and the air tank having a slide mechanism can slide up and down in the vertical direction along the rigid strut of the water tank.

5. The wave power generating system of claim 4, wherein the load container of the air tank is formed of a container for storing a load of fluid such as water or corpuscular material such as sand, the amount of the load being controlled by an air pressure controller.

6. The wave power generating system of claim 4, wherein the pump for supplying water as a load to the load container and the valve for releasing water in the load container outside are automatically controlled in accordance with the value measured by the wave amplitude meter settled at the sea area of the wave energy converters.

7. A wave power generating system comprising:
a plurality of wave energy converters settled to the sea bottom, the converter equipments being sufficiently tall above the sea level for functioning as wave dissipation facilities and each having an air chamber to convert wave energy into air pressure by means of varying water level for operating as an air piston in the air chamber;

a head air duct connecting the plurality of wave energy converters in parallel with one another;

a constant air pressure tank having a variable sufficient capacity, having an air inlet duct connected to the head air duct, and having an air outlet duct to transmit the air pressure equalized by the constant air pressure tank;

an air turbine connected to the air outlet duct;

an electric generator connected to the revolving shaft of the air turbine;

a controller;

a water tank having an upper opening for storing water up to a predetermined level;

an air tank having a bottom opening sunk under the water level in the water tank, the air tank capable of moving up and down in the vertical direction;

a load container provided at the top portion of the air tank; and inlet and outlet air ducts communicating with the air chamber in the air tank;

wherein the water tank has a substantially perpendicular rigid strut and the air tank having a slide mechanism can slide up and down in the vertical direction along the rigid strut of the water tank, and wherein the air pressure controller comprises a pump for supplying water as a load from the water tank to the load container of the air tank, and a valve for feeding the water in the load container back to the water tank.

8. The wave power generating system of claim 7, wherein each wave energy converter comprises:
a structure having the top portion thereof projecting up to a predetermined height above the sea level and having the bottom opening thereof sunk under the sea level wherein the sea level in the structure varies up and down functioning as a piston to form an air chamber in the structure; and a valve mechanism including air inlet and outlet valves provided at the top portion of a casing which forms a portion of the air chamber.

9. The wave power generating system of claim 8, wherein each wave energy converter with said valve mechanism further comprises an air outlet tube provided at the central top portion of the casing and an inlet tube provided at the peripheral top portion of the casing, and the air inlet and outlet tubes have inlet and outlet valves respectively, each of the valves including a valve seat provided at the opening of the inlet or outlet tube and a ball to sit on or off the valve seat in response to the balance of inner and outer air pressures.

10. A wave power generating system of claim 8, wherein each wave energy converter comprises:
a structure made of a steel tube settled by boring to the sea bottom;

a water inlet formed on the steel tube, the upper rim thereof being at a position of about 10–20 centimeters below sea level; and a valve mechanism including air inlet and outlet valves providing at the top portion of the steel tube projecting above the sea level, wherein an air chamber is formed in the steel tube by the water flowed in through the water inlet.

11. A wave power generating system comprising:
a plurality of wave energy converters settled to the sea bottom, the converter equipments being sufficiently tall above the sea level for functioning as wave dissipation facilities and each having an air chamber to convert wave energy into air pressure by means of varying water level for operating as an air piston in the air chamber;

a head air duct connecting the plurality of wave energy converters in parallel with one another;

a constant air pressure tank having a variable sufficient capacity, having an air inlet duct connected to the head air duct, and having an air outlet duct to transmit the air pressure equalized by the constant air pressure tank;

an air turbine connected to the air outlet duct;

an electric generator connected to the revolving shaft of the air turbine;

a controller;

an air tank having a bottom opening sunk under the water level of the sea, the air tank capable of moving up and down in the vertical direction;

a load container provided at the top portion of the air tank; and inlet and outlet air ducts communicating with the air chamber in the air tank;

wherein a substantially perpendicular rigid strut is settled to the sea bottom or other similar water bottom and the air tank having a slide mechanism can slide up and down in the vertical direction along the rigid strut and wherein the air pressure controller comprises a pump for supplying water as a load from the sea to the load container of the air tank, and a valve for feeding the water in the load container back to the sea.

12. A wave power generating system comprising:

a plurality of wave energy converters settled to the sea bottom, the converter equipments being sufficiently tall above the sea level for functioning as wave dissipation facilities and each having an air chamber to convert wave energy into air pressure by means of varying water level for operating as an air piston in the air chamber;

a head air duct connecting the plurality of wave energy converters in parallel with one another;

a constant air pressure tank having a variable sufficient capacity, having an air inlet duct connected to the head air duct, and having an air outlet duct to transmit the air pressure equalized by the constant air pressure tank;

an air turbine connected to the air outlet duct;

an electric generator connected to the revolving shaft of the air turbine;

a controller and in which a method for controlling the air pressure in the constant pressure tank comprises the steps of;

forming an air chamber of the space confined by water in a water tank and an air tank, the water tank having an upward opening for storing water up to a predetermined level, the air tank having a downward opening capable of moving up and down in the vertical direction;

connecting inlet and outlet air ducts to the air tank;

providing a load container at the top portion of the air tank;

properly supplying to or removing from the load container a load such as fluid or corpuscular material to set the air pressure to a target value by applying to the air in the air chamber the total weight of the air tank and the load.

* * * * *